US 8,116,757 B2

(12) United States Patent
Sharaga et al.

(10) Patent No.: US 8,116,757 B2
(45) Date of Patent: Feb. 14, 2012

(54) VIRTUAL NETWORK SERVICE PROVIDER FOR MOBILE VIRTUAL NETWORK OPERATOR ACTIVATION

(75) Inventors: Avishay Sharaga, Bet Nehemya (IL); Danny Moses, Reut (IL); Eetay Natan, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 12/511,913

(22) Filed: Jul. 29, 2009

(65) Prior Publication Data

US 2011/0026501 A1 Feb. 3, 2011

(51) Int. Cl.
*H04W 4/00* (2009.01)
(52) U.S. Cl. .................... 455/422.1; 455/435.1; 370/338
(58) Field of Classification Search .......................... None
See application file for complete search history.

(56) References Cited

U.S. PATENT DOCUMENTS

| 7,565,141 B2 | 7/2009 | Macaluso |
| 2004/0132058 A1* | 7/2004 | Altmann et al. .................. 435/6 |
| 2004/0162058 A1 | 8/2004 | Mottes |
| 2007/0197228 A1 | 8/2007 | McGary et al. |
| 2009/0154413 A1* | 6/2009 | Kim et al. ..................... 370/329 |
| 2010/0004019 A1* | 1/2010 | Di Caprio et al. ......... 455/552.1 |
| 2010/0172283 A1* | 7/2010 | Karaoguz et al. ............. 370/312 |
| 2010/0192212 A1* | 7/2010 | Raleigh ............................ 726/7 |
| 2011/0130140 A1* | 6/2011 | Fadell ........................ 455/435.2 |

FOREIGN PATENT DOCUMENTS

WO WO2009-040761 A2 4/2009

OTHER PUBLICATIONS

International Search Report and Written Opinion mailed Jan. 28, 2011 for International Application No. PCT/US2010/041489.
"IEEE Standard for Local and metropolitan area networks, Part 16: Air Interface for Broadband Wireless Access Systems," IEEE Computer Society and the IEEE Microwave Theory and Techniques Society, IEEE Std 802.16 2009, May 29, 2009, New York, New York.
U.S. Appl. No. 12/631,674, filed Dec. 4, 2009.

* cited by examiner

*Primary Examiner* — Ajit Patel
(74) *Attorney, Agent, or Firm* — Schwabe, Williamson & Wyatt, P.C.

(57) ABSTRACT

Embodiments of the present disclosure describe methods and system configurations to activate a mobile virtual network operator (MVNO). A method includes wirelessly broadcasting a virtual Network Service Provider (NSP) to provide wireless activation of one or more Mobile Virtual Network Operators (MVNOs) associated with a NSP, directing a mobile station (MS) connected to the virtual NSP to a subscription portal that presents to a user of the MS the one or more MVNOs for selection, and provisioning the MS with configuration parameters for a selected MVNO to allow connection of the MS with the selected MVNO. Other embodiments may be described and/or claimed.

20 Claims, 7 Drawing Sheets

VIRTUAL NETWORK SERVICE PROVIDER FOR MOBILE VIRTUAL NETWORK OPERATOR ACTIVATION

FIELD

Embodiments of the present disclosure generally relate to the field of wireless communication systems, and more particularly, to methods and system configurations to activate a mobile virtual network operator (MVNO).

BACKGROUND

Mobile networks that facilitate transfer of information at broadband rates continue to be developed and deployed. Such networks may be colloquially referred to herein as broadband wireless access (BWA) networks and may include networks operating in conformance with one or more protocols specified by the $3^{rd}$ Generation Partnership Project (3GPP) and its derivatives, the WiMAX Forum, or the Institute for Electrical and Electronic Engineers (IEEE) 802.16 standards (e.g., IEEE 802.16-2005 Amendment), although the embodiments discussed herein are not so limited. IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards.

A variety of different device types may be used in broadband wireless technologies. Such devices may include, for example, personal computers, handheld devices, and other consumer electronics such as music players, digital cameras, etc., that are configured to communicate over the wireless broadband networks. Service providers of the wireless broadband networks may activate and enable subscriptions for such wireless devices.

Mobile Virtual Network Operators (MVNOs) are operators that typically do not have their own licensed frequency allocation of radio spectrum, but rather arrange to purchase, for example, air time such as minutes of use (MOU) from traditional mobile operators or service providers for sale to their own customers. Currently, functionality does not exist to over-the-air (OTA) activate MVNOs in wireless broadband networks such as WiMAX. The WiMAX standard, for example, defines a network access provider (NAP) and a network service provider (NSP) as the two business entities. Using the standard NSP advertisement for MVNOs may consume too much bandwidth with a large number of NSPs. Further, the WiMAX standard does not support advertisement of MVNOs (e.g., NSPs that are not directly connected to the NAP). Thus, techniques and configurations are needed to allow activation of MVNOs in such wireless broadband networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide techniques and configurations for MVNO activation in a wireless network. In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

While example embodiments may be described herein in relation to broadband wireless access for wireless metropolitan area networks (WMANs) such as WiMAX networks, embodiments of the invention are not limited thereto and can be applied to other types of wireless networks where similar advantages may be obtained. Such networks include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments of the present invention include, but are not limited to, network interface cards (NICs), network adaptors, base stations, access points (APs), gateways, bridges, hubs and satellite radiotelephones. Further, the radio systems within the scope of embodiments of the invention may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Figure 1:
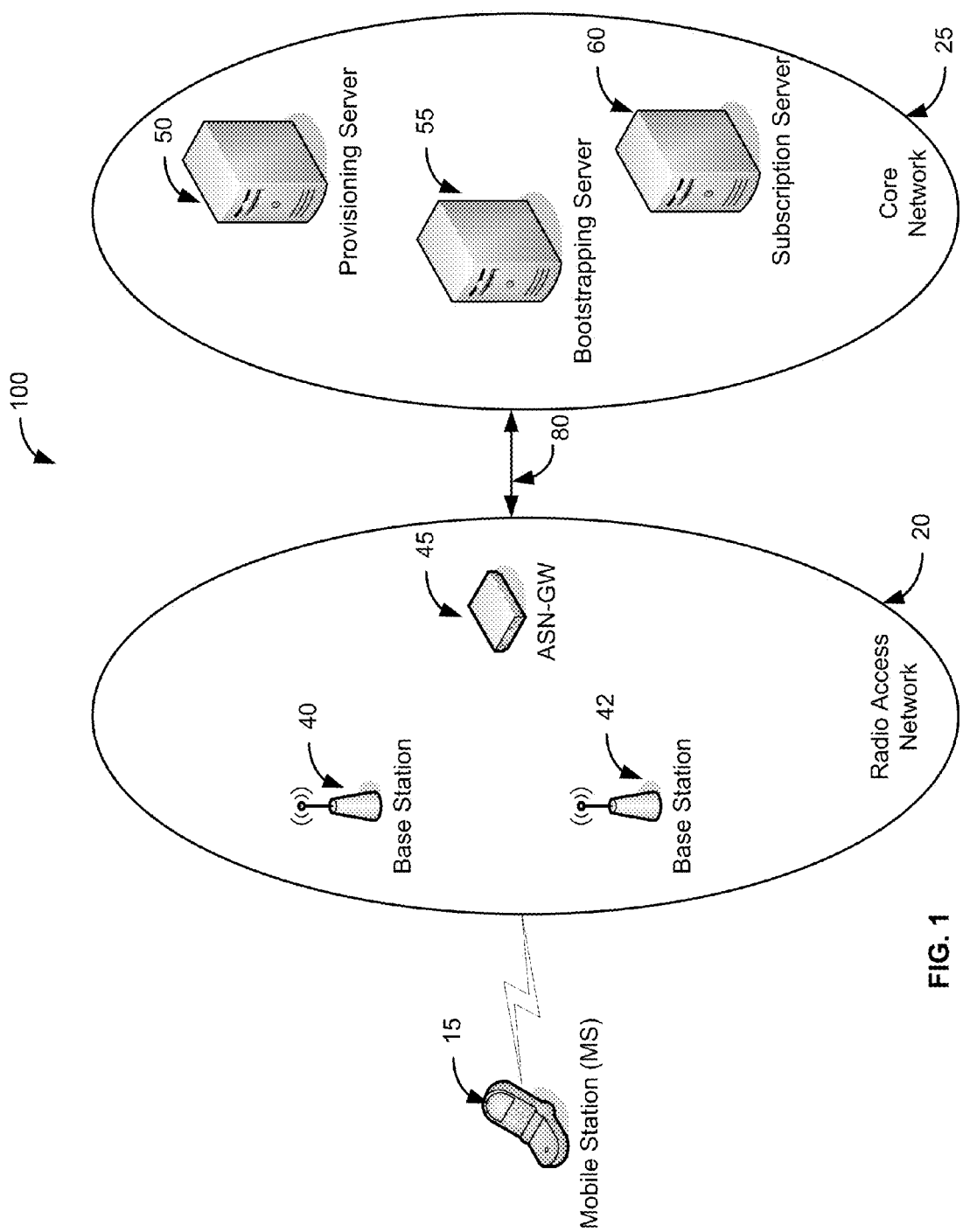
FIG. 1 schematically illustrates an example broadband wireless access (BWA) network architecture in accordance with some embodiments.

FIG. 1 schematically illustrates an example broadband wireless access (BWA) network 100 in accordance with some embodiments. The BWA network 100 may be a network of a network service provider (NSP) having one or more radio access networks (RANs) 20 and a core network 25.

A mobile station (MS) 15 may access the core network 25 via a radio link with a base station (BS) (e.g. BS 40, 42, etc.) in the RAN 20. The MS 15 may, for example, be a subscriber station seeking activation using protocols compatible with the IEEE 802.16 standards (e.g., IEEE 802.16-2005 Amendment) or WiMAX standards, such as Network Working Group (NWG) Rel 1.5 Standard or variants thereof. The base stations 40, 42 may be configured to wirelessly advertise the NSP to the MS 15. While FIG. 1 generally depicts the MS 15 as a cellular phone, in various embodiments the MS 15 may be a notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras, and the like.

In some embodiments, communication with the MS 15 via RAN 20 may be facilitated via one or more access service network gateways (ASN-GWs) 45, although the embodiments are not limited to this specific type of network implementation. ASN-GW 45 (or another similar type of network node) may act as an interface between the core network 25 and its RANs 20. Thus, ASN-GW 45 may be connected to a plurality of base stations 40, 42 and may function as a type of BS controller and/or mobile switching center (MSC) to facilitate handover control and other functions for RAN 20, although the embodiments are not so limited.

The core network 25 may include logic to provide activation of the MS 15 or other actions associated with subscription. For example, the core network 25 may include a provisioning server 50, a bootstrapping server 55, and/or a subscription server 60. Thus, one or more servers 50, 55, 60 associated with the NSP may be communicatively coupled to the base stations 40, 42. The one or more servers 50, 55, 60 may be configured to direct one or more MSes, e.g., MS 15, connected to the NSP to a subscription portal.

In some embodiments, the logic associated with the different functionalities of the depicted servers 50, 55, 60 may be combined to reduce the number of servers, including, for example, being combined in a single machine. Although not shown, the core network 25 may further include several other components, such as an authentication, authorization, and accounting (AAA) server or Home Agent (HA).

Figure 2:
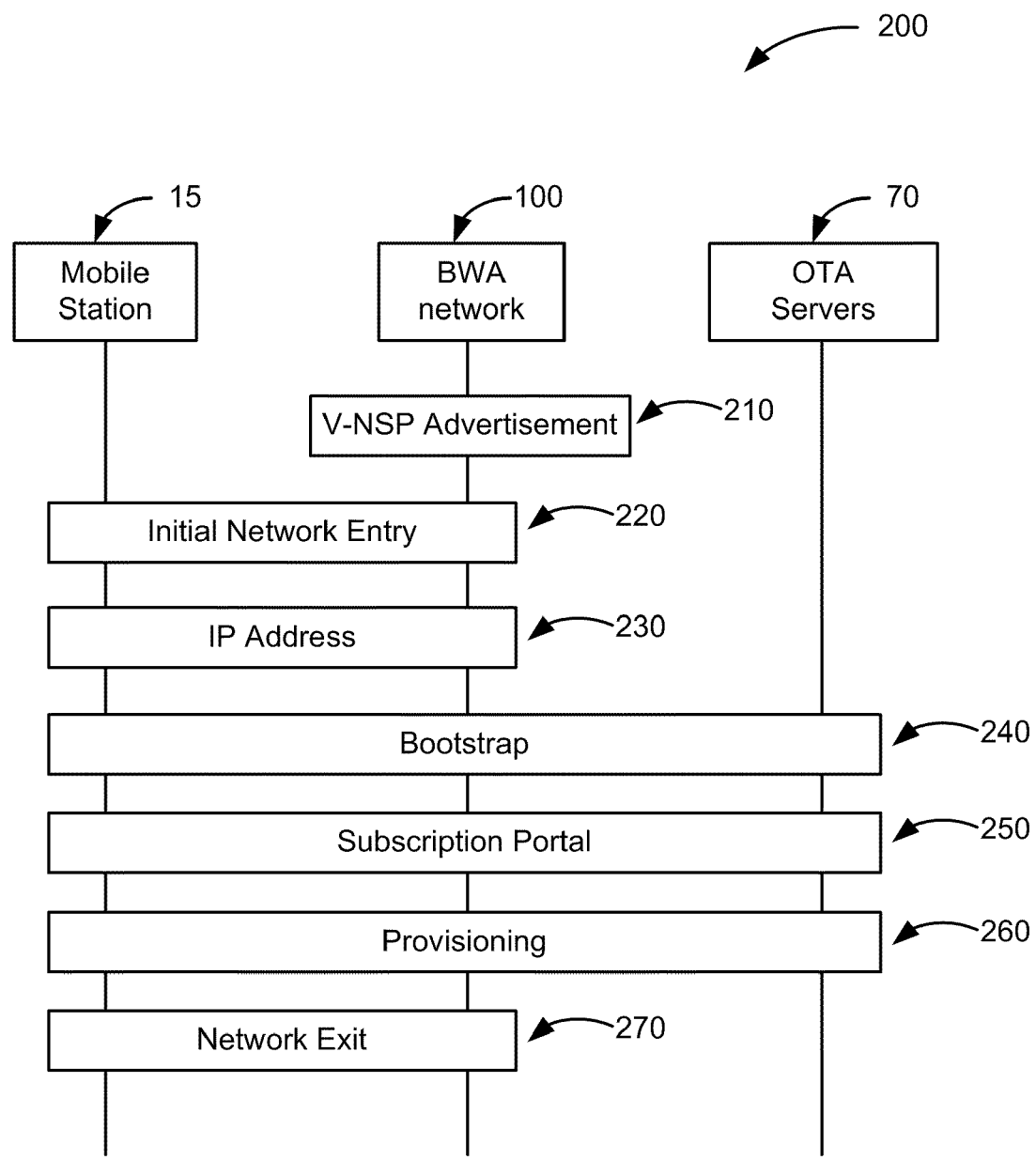
FIG. 2 schematically illustrates an example MVNO activation flow for a wireless network in accordance with some embodiments.

FIG. 2 schematically illustrates an example MVNO activation flow 200 for a wireless network (e.g., BWA network 100) in accordance with some embodiments. Referring to FIGS. 1 and 2, a transmitter (e.g., the BS 40) of the BWA network 100 may wirelessly broadcast a virtual NSP (V-NSP) advertisement, at 210, to provide wireless activation of one or more MVNOs associated with an NSP. The one or more MVNOs may be associated with the NSP, for example, through a purchase/sale agreement of services provided by the NSP for customers of the MVNO. The virtual NSP may be "virtual" in the sense that it does not represent an actual NSP. For example, the virtual NSP is not activated during the MVNO activation flow 200, but rather provides a non-provisioned device (e.g., the MS 15) that is connected to the virtual NSP access to a subscription portal where one or more MVNOs associated with an actual NSP may be selected. The non-provisioned device may then be activated for the selected MVNO.

The non-provisioned device (e.g., the MS 15) may enter the NSP's BWA network 100 at 220. A variety of operations may be performed to accommodate the initial network entry at 220. For example, the non-provisioned MS 15 may perform actions associated with network discovery and selection (ND&S), such as scanning and detecting the advertised virtual NSP and, possibly, the actual NSP that is associated with one or more MVNOs selectable via the virtual NSP. A user of the MS 15 may choose to connect to the virtual NSP. The MS 15 may be configured to determine whether the virtual NSP is activated. As discussed above, the virtual NSP is not activated even after the MS 15 is provisioned to connect with a selected MVNO to allow a user of the MS 15 to potentially activate other MVNOs selectable via the virtual NSP. The MS 15 may determine whether the virtual NSP is activated by, for example, determining whether provisioning for the MS 15 is needed. A non-provisioned MS 15 may, for example, indicate that the MS 15 is not activated.

After determining that the virtual NSP is not activated, the non-provisioned MS 15 may configure various parameters to trigger an activation process. For example, in a WiMAX setting, the MS 15 may configure a Network Access Identifier (NAI) to {sm=1}MAC@[realm], where the [realm] portion identifies the virtual NSP. Authentication of the MS 15 may be set to Transport Layer Security (TLS) as for activation. Other operations may be performed to connect the MS 15 to the BWA network 100 via the virtual NSP, such as operations to authenticate the MS 15. Authentication may be performed using, for example, Extensible Authentication Protocol (EAP).

Upon entry of the MS 15 into the BWA network 100, the MS 15 may obtain an internet protocol (IP) address at 230 to establish a data path with the network 100 and/or over-the-air (OTA) servers 70. The activation process may use IP to exchange information between the non-provisioned MS 15 and the BWA network 100 and/or the OTA servers. The IP address may be provided, for example, by a server in a connectivity service network (CSN) of the BWA network 100 using a Dynamic Host Configuration Protocol (DHCP). Other configurations and/or protocols may be supported.

The non-provisioned MS 15 may further engage in a bootstrapping sequence at 240. The bootstrapping may be triggered, for example, by configuration parameters that indicate that the MS 15 is not provisioned or that otherwise indicate that the MS 15 is not activated and/or ready for activation. The ASN-GW 45 of the BWA network 100 or other similar functioning device may hot-line the MS 15 to the bootstrapping server 55, which may be among the OTA servers 70. Through hot-lining, the MS 15 may be directed to, and be able to access the bootstrapping server 55 to exchange bootstrap information. The bootstrap 240 may be obtained according to a specification or standard in accordance with Open Mobile Alliance Device Management (OMA-DM), such as version 1.2 of the OMA-DM specification released in April 2006 or variants thereof. The MS 15 may start an OMA session, for example, to facilitate subscription services at the subscription portal 250 and/or provisioning the MS 15 at 260.

A user of the MS 15 may be presented with a list of MVNOs for connection. In response to a selected MVNO for connection, the MS 15 may be directed to a subscription portal at 250. The subscription portal 250 may provide subscription services via Hypertext Transfer Protocol (HTTP) or any other suitable protocol. For example, the subscription server 60 or other logic having similar functionality may be part of the OTA servers 70 and may provide web-based subscription services via a web browser of the MS 15. Upon being directed to the subscription portal 250, a user of the MS 15 may exchange information with the subscription server 60 to create a user account with the selected MVNO.

Operations herein may occur in a different order than depicted. For example, the user of the MS 15 may be presented with a list of MVNOs for connection before the bootstrap is obtained according to various embodiments.

After creating the user account at the subscription portal at 250, provisioning of the MS 15 may occur at 260. The virtual NSP may provision the MS 15 with configuration parameters for the selected MVNO to allow connection and normal working operation of the MS 15 with the selected MVNO. For example, the provisioning server 50 or other logic having similar functionality may be part of the OTA servers 70 and may provision the MS 15, at least in part, by building a bootstrap message having a device management account (DM-ACC) tree, which may include the OMA-DM server's account information for the selected MVNO. In some embodiments, the provisioning at 260 may configure the DM-ACC tree such that the selected MVNO's provisioning server takes control of management operations when the MS 15 is connected to the selected MVNO.

Figure 3:
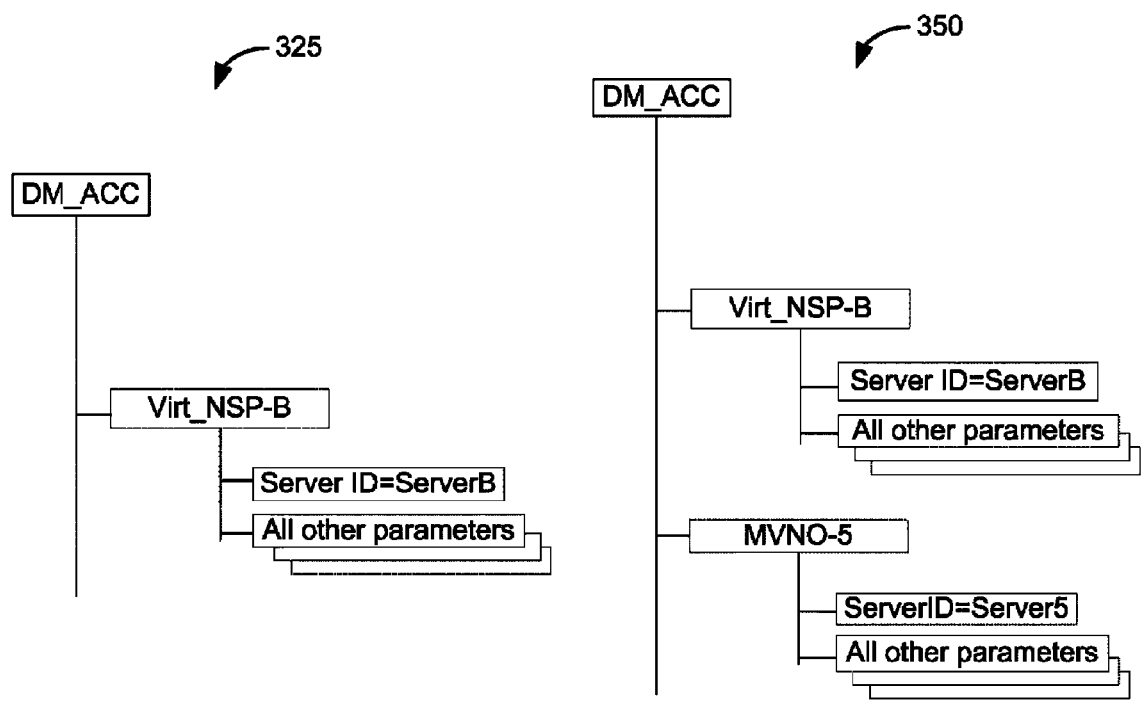
FIG. 3 schematically illustrates an example configuration parameter tree structure in accordance with some embodiments.

Referring briefly to FIG. 3, which schematically illustrates an example configuration parameter tree structure in accordance with some embodiments, a DM-ACC tree 325 before provisioning and a DM-ACC tree 350 after provisioning are illustrated. As depicted, before provisioning, the DM-ACC tree 325 has OMA-DM server account information for the virtual NSP (e.g., Virt_NSP-B), such as a particular Server ID (e.g., ServerB) and other parameters. After provisioning, the DM-ACC tree 350 has added OMA-DM server account information for the selected MVNO (e.g., MVNO-5), such as the particular Server ID (e.g., Server5) among other parameters. The DM-ACC tree 350 may include other parameters that a client, e.g., MS 15, may need to create an OMA-DM session, such as server domain name and/or credentials.

Figure 4:
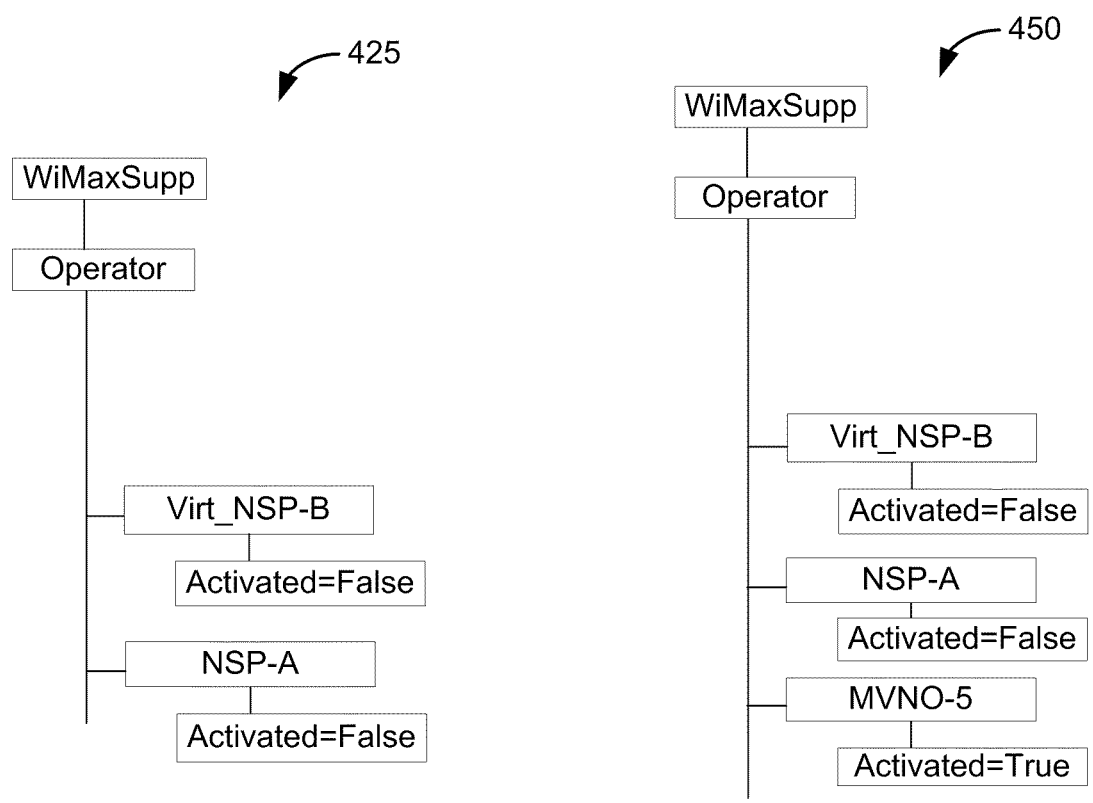
FIG. 4 schematically illustrates another example configuration parameter tree structure in accordance with some embodiments.

Turning now briefly to FIG. 4, which schematically illustrates another example configuration parameter tree structure in accordance with some embodiments, the provisioning server 50 may further provision the MS 15, at least in part, by building a configuration tree of the selected MVNO. Such building of the configuration tree may include creating, for example, a WiMAX supplement (e.g., WiMaxSupp) and/or setting an activation flag to indicate activation of the MS 15 for the selected MVNO. For example, before provisioning, the configuration tree 425 depicts an operator of the WiMax-Supp configured with parameters that indicate an inactivated status (e.g. Activated=False) of the MS 15 for the Virtual NSP (e.g., Virt_NSP-B) and for the actual NSP (e.g., NSP-A) associated with one or more MVNOS. After provisioning, the configuration tree 450 is configured with a parameter that indicates activation (e.g., Activated=True) for the selected MVNO (e.g., MVNO-5) of the one or more MVNOs. As depicted in the configuration tree 450, after provisioning, the virtual NSP (e.g., Virt_NSP-B) and the actual NSP (e.g., NSP-A) associated with the selected MVNO remain inactivated (e.g., Activated=False). The configuration tree 450 may include other information, such as a list of roaming partners, subscription parameters, and/or credentials.

Returning again to FIG. 2, a network exit at 270 may be performed after provisioning the MS 15 at 260. The network exit 270 may allow subsequent connection of the provisioned MS 15 with the prior selected and now activated MVNO. For example, after provisioning 260 and network exit 270 for the activated MVNO, the provisioned MS 15 may scan and detect an advertisement for the virtual NSP, the activated MVNO, and possibly the real NSP associated with the activated MVNO. The user of the MS 15 may connect to the activated MVNO, whereupon the MS 15 determines that the MVNO is activated. After configuring, for example, parameters such as NAI and Authentication in accordance with the activated MVNO, the MS 15 may enter the BWA network 100 using the activated MVNO. An IP address may be obtained to start an OMA session according to the DM-ACC to allow the MS 15 to operate as an activated device within the BWA network 100.

According to various embodiments, mapping between the advertisements and the MVNO/NSP may be internal to the MS 15. Such mapping may be provisioned, for example, while the MS 15 is connected to the virtual NSP.

Figure 5:
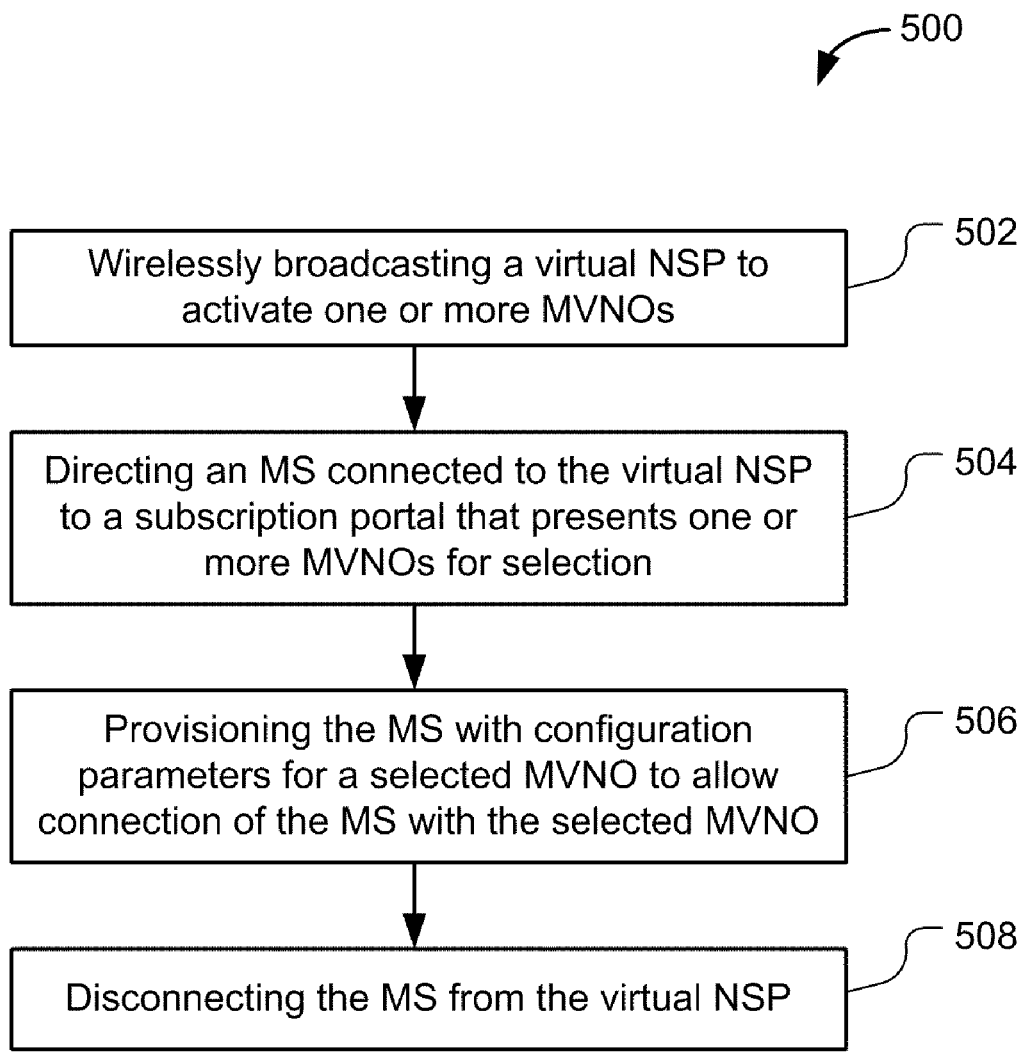
FIG. 5 is a flow diagram of a method for MVNO activation in accordance with some embodiments.

FIG. 5 is a flow diagram of a method 500 for MVNO activation in accordance with some embodiments. The activation method may be performed OTA. Method 500 may include wirelessly broadcasting a virtual NSP to provide wireless activation of one or more MVNOs associated with a NSP, at 502. Wirelessly broadcasting the virtual NSP may be performed by a base station (e.g., BS 40, BS 42, etc.) of the BWA network 100. According to various embodiments, wirelessly broadcasting at 502 is performed using a WiMAX network.

At block 504, method 500 may further include directing an MS, e.g., MS 15, connected to the virtual NSP to a subscription portal that presents to a user of the MS 15 the one or more MVNOs for selection. The subscription portal may provide subscription services according to HTTP or any other suitable protocol.

At block 506, method 500 may further include provisioning the MS 15 with configuration parameters for a selected MVNO to allow connection of the MS 15 with the selected MVNO. Such provisioning may include setting an activation flag to indicate activation of the selected MVNO, but not the virtual NSP, in order to allow a user of the MS 15 to subsequently activate one or more MVNO(s) other than the selected MVNO using the virtual NSP.

The provisioning at 506 may be performed, for example, by logic associated with the NSP or the virtual NSP (e.g., OTA servers 70). The MS 15 may be configured by the logic associated with the NSP or the virtual NSP to be controlled by logic associated with the selected MVNO when the MS 15 is connected with the selected MVNO. In this regard, the provisioning for the MVNO may be performed by logic associated with the virtual NSP (e.g., the provisioning server for the virtual NSP) that is different from the logic that controls the device when connected (e.g., the provisioning server for the selected MVNO).

The provisioning at 506 may further include building a bootstrap message including account information of the selected MVNO and/or building a configuration tree of the selected MVNO. Such actions may be performed, for example, by the logic associated with the NSP or the virtual NSP.

At block 508, the method 500 may further include disconnecting the MS 15 from the virtual NSP. Such action may allow the MS 15 to connect to the selected MVNO. Method 500 may further include other actions or operations described herein.

Figure 6:
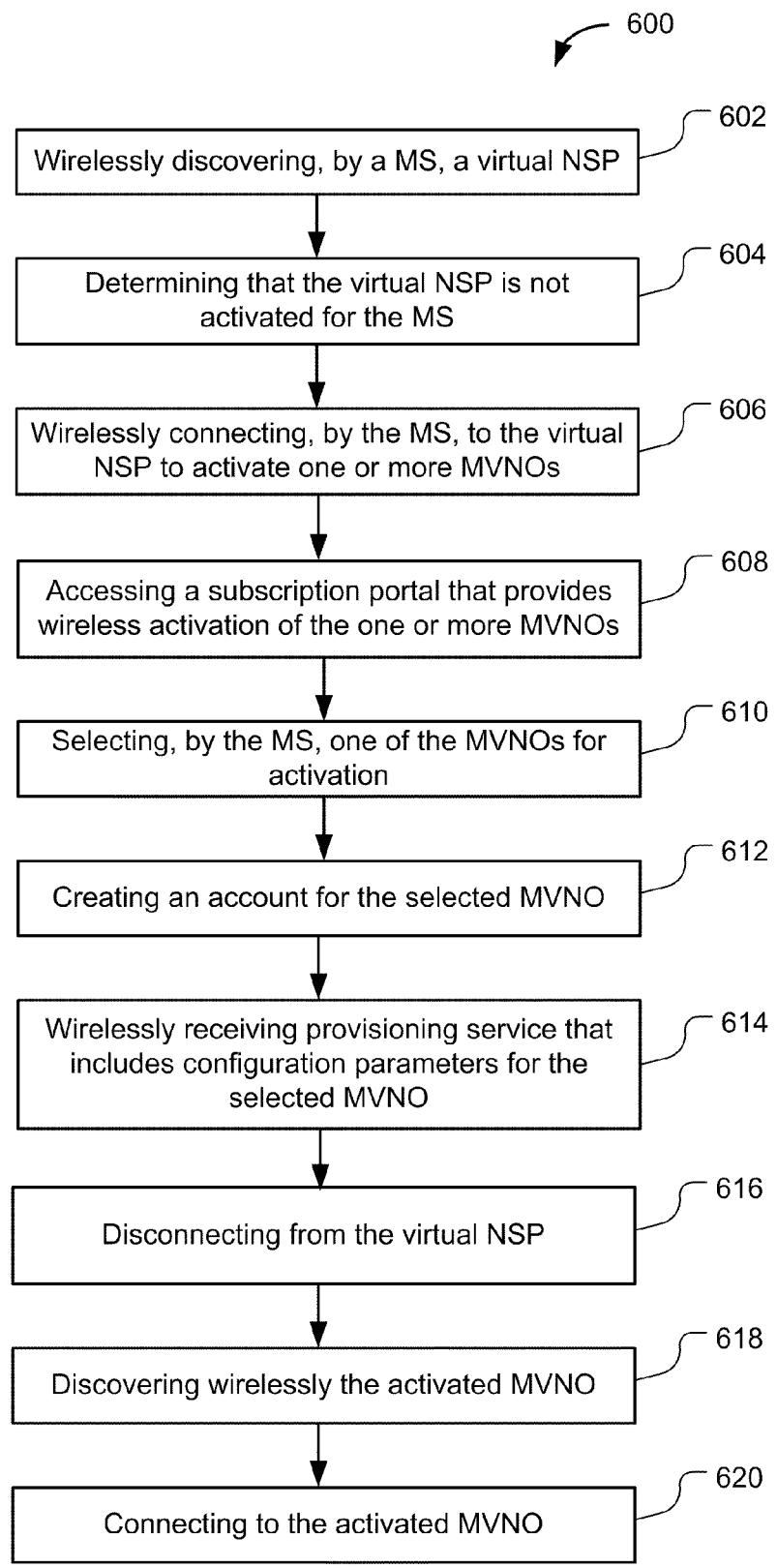
FIG. 6 is another flow diagram of a method for MVNO activation in accordance with some embodiments.

FIG. 6 is another flow diagram of a method 600 for MVNO activation in accordance with some embodiments. At block 602, the method 600 may include wirelessly discovering by an MS, e.g., MS 15, a virtual NSP. Such discovering may be accomplished, for example, according to an ND&S technique of the MS 15 that scans and detects available wireless networks for connection.

At block 604, the method 600 may further include determining, by the MS 15, that the virtual NSP is not activated for the MS 15. The virtual NSP may not be activated in order to allow a user of the MS 15 to subsequently activate one or more MVNOs other than the selected MVNO using the virtual NSP.

At block 606, the method 600 may further include wirelessly connecting, by the MS 15, to the virtual NSP to activate one or more MVNOs associated with a NSP. Various operations may be performed to authenticate and otherwise allow the MS 15 to enter the network, some of which may be described herein with respect to at least FIG. 2. Then, at block 608, the MS may access a subscription portal that provides wireless activation of the one or more MVNOs. According to various embodiments, accessing the subscription portal at 608 may provide wireless activation of the NSP associated with the one or more MVNO(s). Various operations may be performed prior to accessing the subscription portal, including, for example, obtaining an IP address and/or bootstrap as described with respect to FIG. 2.

At block 610, the method 600 may further include selecting, by the MS 15, one of the one or more MVNOs presented to a user of the MS 15. At block 612, the user may create an account, by the MS 15, for the selected MVNO.

At block 614, the MS 15 may wirelessly receive provisioning service that includes configuration parameters for the selected MVNO. The configuration parameters may allow the MS 15 to connect to the selected MVNO. Receiving the provisioning service at block 614 may include setting an activation flag to indicate activation of the selected MVNO, but not the virtual NSP.

At block 616, the MS 15 may disconnect from the virtual NSP after receiving the provisioning service at block 614 to allow connection to the activated MVNO. The provisioned MS 15 may, for example, wirelessly discover the earlier selected and now activated MVNO at block 618 and connect to the activated MVNO at block 620. Method 600 may further include other actions or operations described herein.

Figure 7:
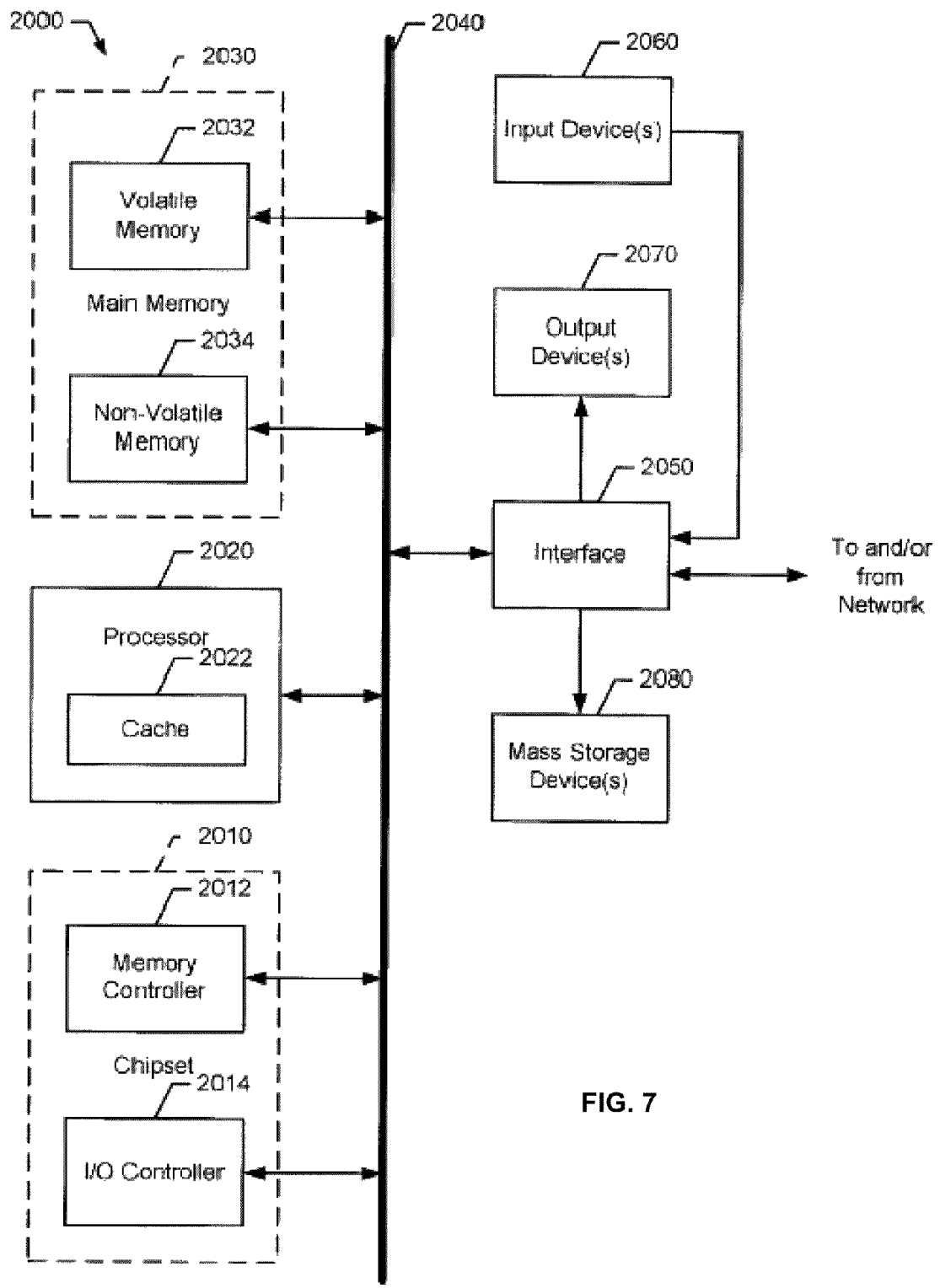
FIG. 7 schematically illustrates an example processor based system that may be used to practice various embodiments described herein.

FIG. 7 schematically illustrates an example processor-based system that may be used to practice various embodiments described herein. The processor system 2000 may be a desktop computer, a laptop computer, a handheld computer, a tablet computer, a PDA, a server, an Internet appliance, and/or any other type of computing device. In some embodiments, the processor system 2000 may be capable of functioning as the MS 15, the provisioning server 50, the bootstrapping server 55, and/or the subscription server 60 or provide logic that performs similar functions as servers 50, 55, 60.

The processor system 2000 illustrated in FIG. 7 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. While FIG. 7 shows a bus 2040 to communicatively couple various components to one another, other embodiments may include additional/alternative interfaces.

The volatile memory 2032 may be implemented by synchronous dynamic random access memory (SDRAM), dynamic random access memory (DRAM), RAMBUS dynamic random access memory (RDRAM), and/or any other type of random access memory device. The non-volatile memory 2034 may be implemented using flash memory, read only memory (ROM), electrically erasable programmable read only memory (EEPROM), and/or any other desired type of memory device.

An article of manufacture is disclosed herein. The article of manufacture may include a computer-readable medium having instructions stored thereon, that if executed, result in the actions described herein. The computer-readable medium may include, for example, components of main memory 2030 and/or the mass storage device(s) 2080 or any other suitable storage medium.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

In some embodiments, the processor system 2000 may be coupled to an antenna structure (not shown in the figure) to provide access to other devices of a network. In some embodiments, the antenna structure may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions. In some embodiments, the antenna structure may include one or more directional and/or omnidirectional antennas, including, e.g., a dipole antenna, a monopole antenna, a patch antenna, a loop antenna, a microstrip antenna or any other type of antennas suitable for OTA transmission/reception of RF signals.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method comprising:
   wirelessly broadcasting a virtual Network Service Provider (NSP) to provide wireless activation of one or more Mobile Virtual Network Operators (MVNOs) associated with a NSP;
   directing a mobile station (MS) connected to the virtual NSP to a subscription portal that presents to a user of the MS the one or more MVNOs for selection; and
   provisioning the MS with configuration parameters for a selected MVNO to allow connection of the MS with the selected MVNO, wherein said provisioning the MS indicates the activation of the selected MVNO, but not the virtual NSP, in order to allow a user of the MS to subsequently activate one or more MVNOs other than the selected MVNO using the virtual NSP.

2. The method of claim 1, wherein said provisioning the MS comprises:
   setting an activation flag to indicate the activation of the selected MVNO.

3. The method of claim 1, wherein said wirelessly broadcasting the virtual NSP is performed by a base station of a Worldwide Interoperability for Microwave Access (WiMAX) network.

4. The method of claim 1, wherein said directing the mobile station (MS) comprises directing the mobile station connected to the virtual NSP to a subscription portal, wherein the subscription portal provides subscription services via Hypertext Transfer Protocol (HTTP).

5. The method of claim 1, wherein said provisioning the MS is performed by logic associated with the NSP or the virtual NSP.

6. The method of claim 5, wherein said provisioning the MS further comprises:
   configuring the MS, by the logic, to be controlled by logic associated with the selected MVNO when the MS is connected with the selected MVNO.

7. The method of claim 5 wherein said provisioning the MS further comprises:
   building, by the logic, a bootstrap message including account information of the selected MVNO.

8. The method of claim 5 wherein said provisioning the MS further comprises:
   building, by the logic, a configuration tree of the selected MVNO.

9. The method of claim 1, further comprising:
   disconnecting the MS from the virtual NSP to allow connection of the MS to the selected MVNO.

10. A method comprising:
    wirelessly connecting, by a mobile station (MS), to a virtual Network Service Provider (NSP) to activate one or more Mobile Virtual Network Operators (MVNOs) associated with a NSP; and
    wirelessly receiving, by the MS, provisioning service that includes configuration parameters for a selected MVNO of the one or more MVNOs, wherein the configuration parameters allow connection of the MS to the selected MVNO, and wherein the provisioning service includes an indication of activation of the selected MVNO, but not the virtual NSP, in order to allow a user of the MS to subsequently activate one or more MVNOs other than the selected MVNO using the virtual NSP.

11. The method of claim 10, further comprising:
    accessing, by the MS, a subscription portal that provides wireless activation of the one or more MVNOs; and
    selecting, by the MS, one of the one or more MVNOs presented to a user of the MS.

12. The method of claim 11, further comprising:
    creating an account for the selected MVNO.

13. The method of claim 10, further comprising:
    accessing, by the MS, a subscription portal that provides wireless activation of the NSP.

14. The method of claim 10, further comprising:
    discovering wirelessly, by the MS, the virtual NSP prior to said wirelessly connecting to the virtual NSP.

15. The method of claim 10, further comprising:
    determining, by the MS, that the virtual NSP is not activated for the MS prior to said wirelessly connecting to the virtual NSP.

16. The method of claim 10, wherein said wirelessly receiving the provisioning service comprises:
    setting an activation flag to indicate the activation of the selected MVNO.

17. The method of claim 10, further comprising:
    disconnecting from the virtual NSP after said wirelessly receiving of the provisioning service;
    discovering at least in part wirelessly, by the MS, the selected MVNO; and
    connecting, by the MS, to the selected MVNO.

18. An apparatus comprising:
    one or more processors configured to communicate with one or more mobile stations (MS) in a vicinity of a wireless network via a base station of the wireless network, the base station being configured to wirelessly advertise a virtual Network Service Provider (NSP) to the one or more mobile stations (MS), wherein the virtual NSP is configured to provide wireless activation of one or more Mobile Virtual Network Operators (MVNO) associated with an NSP; and
    a storage medium coupled to the one or more processors, the storage medium having instructions stored thereon, that if executed by the processor, result in directing an MS connected to the virtual NSP to a subscription portal that presents to a user of the MS the one or more MVNOs for selection, and provisioning the MS with configuration parameters for a selected MVNO to allow connection of the MS with the selected MVNO, wherein said provisioning the MS indicates the activation of the selected MVNO, but not the virtual NSP, in order to allow a user of the MS to subsequently activate one or more MVNOs other than the selected MVNO using the virtual NSP.

19. The apparatus of claim 18, wherein provisioning the MS further comprises:

setting an activation flag to indicate the activation of the selected MVNO.

20. The apparatus of claim 18, wherein the processor is a processor of one or more over-the-air (OTA) servers that provide MS activation services for the NSP.

\* \* \* \* \*